United States Patent Office 3,457,063
Patented July 22, 1969

3,457,063
METHODS OF CONTROLLING WEEDS WITH DERIVATIVES OF AMINOOXY LOWER ALKANOIC ACIDS
Ralph P. Neighbors, Olathe, Kans., assignor to Gulf Oil Corporation, Pittsburgh, Pa., a corporation of Pennsylvania
No Drawing. Filed June 12, 1964, Ser. No. 374,813
Int. Cl. A01n 9/20
U.S. Cl. 71—115                                    3 Claims

ABSTRACT OF THE DISCLOSURE

Undesired plant growth is combated by applying to the locus of the plant one of a large class of alkanoic acid derivatives of the formula

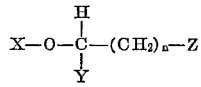

in which X is amino, alkylamino, alkylideneamino, acylamino, dicarboximido, ureido, alkylureido, arylureido or acylureido; Y is hydrogen or an organic substituent as represented by Z; $n$ is zero or a small whole number, and Z is cyano, carboxy or a salt thereof, carbamyl, N-substituted carbamyl or carbalkoxy.

---

Although many highly active non-selective herbicides are known, there are few situations which require the use of such substances. The commonest type of situation in which a herbicide may be used requires the control of one or more species of weeds in the presence of a growing crop plant. Unfortunately, weeds belong to a large number of families of plants, possess great differences in susceptibility to chemical control and in general appear to be more resistant than many crop plants. As a result, many species of noxious weeds have not yet been successfully controlled by means of herbicides.

The method of this invention is based on the discovery that interesting selective herbicidal properties are possessed by a class of organic compounds, each of which possesses a nitrogen-to-oxygen bond. Briefly, the method of this invention contemplates applying to the locus of plant growth a compound represented by the general formula

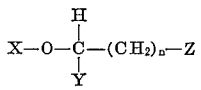

in which X is amino, alkylamino, alkylideneamino, acylamino, dicarboximido, ureido, alkylureido, arylureido or acylureido; Y is hydrogen or an organic substituent as represented by Z; $n$ is zero or a small whole number and Z is cyano, carboxy or a salt thereof, carbamyl, N-substituted carbamyl or carbalkoxy.

SUMMARY OF INVENTION

Detailed description of the invention

Some of the compounds employed in the method of this invention are novel; some are known. (For information on substituted aminoöxyacetic acids, see, for example, J. Chem. Soc., 227 (1960); J. Dental Res. 40, 199–203 (1961); Brit. J. Pharmacol. 15, 243–6 (1960); Bull. Soc. Chim. France, 1958, 664–9.)

Examples of compounds which are preferred for control of weeds, particularly of the genus Setaria, in small grains, sugar beets, flax, safflower and cotton are those represented by the following structural formulas:

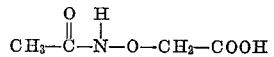

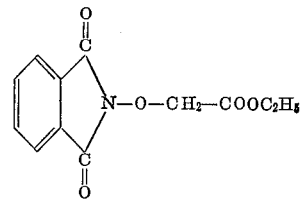

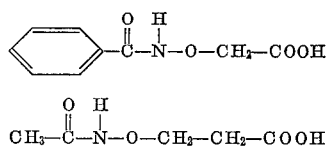

Structural formulas are employed in the following discussion to improve clarity of expression. Since the aminoöxy structure is not an index compound according to the rules of nomenclature of the International Union of Pure and Applied Chemistry, the systematic names of the compounds in some instances bear little resemblance to each other. A list of names therefore fails to readily convey to the reader the fact that all of the suitable substances contain the

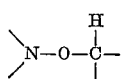

structure.

So as to make clear the class of compounds which may be employed in the method of this invention, the following example is presented, showing the activity of a number of suitable compounds as post-emergent herbicides at a rate of application of 5 pounds per acre.

EXAMPLE

A water suspension of the chemical is prepared by combining 0.4 gram of the chemical to be tested with 4 ml. of a solvent mixture (3 parts Emulphor EL-719 combined with one part xylene and one part kerosene) and then adding sufficient warm water to make 40 ml. of mixture. Emulphor EL-719 is described as a polyoxyethylated vegetable oil.

Oats, wheat, peas, radish, flax, millet, alfalfa, tomatoes, and sugar beets are planted in 4 in. pots in the greenhouse. Ten to eighteen days after the emergence of the plants, they are sprayed with the above prepared water emulsions at a rate of 5 pounds of the active chemical per acre and a spray volume of 60 gallons per acre. Seven days after application, the plants are observed and the results of the treatment are as shown in the table.

The plants are rated as follows:

C=Chlorosis.           0=No effect.
N=Necrosis.            1=Slight effect.
G=Growth inhibition.   2=Moderate effect.
K=Non-emergence.       3=Severe effect.
F=Formative effect.    4=Maximum effect or dead plants.

TABLE

Post-emergent Activity at 5 lb./Acre

| Structure | Tomato | Millet | Flax | Soybeans | Corn | Wheat | Oats | Radish | Sugar Beets | Alfalfa |
|---|---|---|---|---|---|---|---|---|---|---|
| Phenyl-C(O)-N(H)-O-CH(CH₃)-COOH (M.P. 182–3° C.) | N4 | N4 | N1 | N4 | G3, N1 | N2 | N1 | N2 | N4 | N1, G2 |
| 4-Cl-phenyl-C(O)-N(H)-O-CH(CH₃)-COOH (M.P. 144–5°) | N4 | N4 | G2, N1 | N4 | N4 | N4 | N2 | N4 | N4 | N4 |
| 3,4-diCl-phenyl-C(O)-N(H)-O-CH(CH₃)-COOH (M.P. 201–3°) | N4 | N2 | N1, G2 | G2 | F1, G2 | N1 | N1 | N2 | N4 | N1 |
| 3,4-diCl-phenyl-C(O)-N(H)-O-CH₂-COOH (M.P. 198–200°) | N4 | N4 | N2 | G2, C1 | N1 | N2 | C1 | C2 | N4 | N2 |
| 4-Cl-phenyl-C(O)-N(H)-O-CH₂-COOH (M.P. 147–9°) | N4 | N4 | N3 | G2 | N1 | N2 | N1 | N4 | N4 | N2 |
| 3,4-diCl-phenyl-C(O)-N(H)-O-CH₂-COOH (M.P. 168–70°) | N4 | N4 | N1 | G1 | N1 | N1 | 0 | 0 | N2 | 0 |
| 2,6-diCl-phenyl-C(O)-N(H)-O-CH₂-COOH (M.P. 155–7°) | N4 | N3 | N2 | F2, G2 | N1 | N1 | 0 | N1 | N1 | F1, N1 |
| phenyl-C(O)-N(H)-O-CH₂-COOK (Decomp. 193°) | N4 | N4 | G3, C2 | G3, N3 | G3, N3 | N1 | N1 | N3 | N4 | 0 |
| 2-Cl-phenyl-C(O)-N(H)-O-CH₂COO⁻ +H₃NC₄H₉ (In aqueous solution) | N4 | N4 | 0 | G3, N3 | N4 | N4 | G2, C3 | G3, C2 | G3, C3 | N4 |
| 4-CH₃O-phenyl-C(O)-N(H)-O-CH₂COOH (M.P. 174–6°) | N4 | N4 | N2 | G2, N1 | G3, N3 | N4 | N | N3 | N4 | N2 |

TABLE—Continued

| Structure | Post-emergent Activity at 5 lb./Acre | | | | | | | | | |
|---|---|---|---|---|---|---|---|---|---|---|
| | Tomato | Millet | Flax | Soybeans | Corn | Wheat | Oats | Radish | Sugar Beets | Alfalfa |
| $CH_3O-\phi-\underset{O}{\overset{O}{\underset{\|}{C}}}-\underset{H}{\overset{\|}{N}}-O-\underset{CH_3}{\overset{\|}{CH}}-COOH$ (M.P. 156-8°) | N4 | G3, N3 | 0 | N2 | N2 | N1 | N1 | G2 | N4 | N1 |
| $\phi-\underset{O}{\overset{O}{\underset{\|}{C}}}-\underset{H}{\overset{\|}{N}}-OCH_2COO^- H-N^+\phi$ (Aqueous solution) | N4 | N4 | 0 | G3, N2 | G3, N3 | N1 | N1 | N2 | N1 | N1 |
| $CH_3-C(=N-O-CH_2CH_2COOCH_3)-CH_3$ (B.P. 92-4°/20 mm.) | N4 | N4 | N4 | G1, N2 | G2, N1 | 0 | 0 | N1 | N1 | N1 |
| $\phi-\underset{O}{\overset{O}{\underset{\|}{C}}}-\underset{H}{\overset{\|}{N}}-O-CH(CO_2C_2H_5)-CH_2COOH$ ($n_D^{20}$ 1.5197) | N4 | G2 | 0 | 0 | 0 | 0 | 0 | 0 | 0 | 0 |
| $\phi-\underset{O}{\overset{O}{\underset{\|}{C}}}-\underset{H}{\overset{\|}{N}}-OCH_2CO_2H$ (M.P. 153-5°) | N4 | N4 | N3 | N4 | G2, N2 | N1 | N1 | N2 | N4 | G2, N2 |
| $\phi-\underset{O}{\overset{O}{\underset{\|}{C}}}-\underset{H}{\overset{\|}{N}}-OCH_2CO_2^- NH_4^+$ (In aqueous solution) | N4 | N4 | G3 | N1, G1 | N3, G3 | N1, G1 | N1, G1 | N3 | N4 | N1 |
| $Cl-\phi-\underset{O}{\overset{O}{\underset{\|}{C}}}-\underset{H}{\overset{\|}{N}}-OCH_2CO_2^- NH_4^+$ (In aqueous solution) | N4 | N2, G1 | G2 | N1, G1 | N3, G3 | 0 | 0 | N1 | N4 | 0 |
| $(H_2NOCH_2CO_2H)_2 \cdot HCl$ (M.P. 148-50°) | G3, N2 | N1 | N1 | N1 | 0 | 0 | 0 | 0 | C3, G2 | 0 |
| $\phi-CH=NOCH_2CO_2H$ (M.P. 93-5°) | G1, N2 | G2, N1 | N1 | N1 | 0 | 0 | 0 | 0 | G1 | 0 |
| $(CH_3)_2C=NOCH_2CO_2H$ (M.P. 73-5°) | N4 | N4 | N4 | G3, N3 | G3, N2 | C1 | C1 | N4 | N4 | N4 |
| $CH_3\underset{O}{\overset{O}{\underset{\|}{C}}}-\underset{H}{\overset{\|}{N}}-OCH_2COOH$ (M.P. 136-7°) | N4 | N4 | N4 | N4 | N4 | N4 | N4 | N4 | N4 | N4 |
| $HCl \cdot H_2N-O-CH_2CH_2COOH$ (M.P. 152-4°) | N4 | N4 | N4 | N4 | G3, N2 | N1 | N1 | N4 | N4 | G2, N2 |

TABLE—Continued

| Structure | Post-emergent Activity at 5 lb./Acre ||||||||||
| --- | --- | --- | --- | --- | --- | --- | --- | --- | --- | --- |
| | Tomato | Millet | Flax | Soybeans | Corn | Wheat | Oats | Radish | Sugar Beets | Alfalfa |
| ![structure] C₆H₅—C(O)—N(H)—O—CH₂—N(H)—C(O)—C₆H₅ (M.P. 137-8°) | 0 | N4 | 0 | 0 | G1, N1 | 0 | 0 | G2, N1 | 0 | 0 |
| CH₃—C(CH₃)=N—O—CH₂—C(O)—NH₂ (M.P. 88-90°) | N3 | G2, C1 | N2 | G2, N3 | N1 | 0 | 0 | N1 | G1 | G2, C2 |
| H₂N—O—CH₂—CH₂—C=N·HCl (M.P. 133-5°) | G2, N2 | G2 | N1 | N1 | 0 | 0 | 0 | N1 | G1 | 0 |
| 4-Cl-C₆H₄—N(H)—C(O)—N(H)—O—CH₂CH₂COOH (M.P. 173-174.5°) | 0 | G2, N2 | G2, N3 | N4 | 0 | N1 | 0 | N4 | N4 | N4 |
| O₂N—C₆H₄—C(O)—N(H)—O—CH₂COOH (M.P. 143-5°) | N4 | G2, N3 | N1 | G1 | G2, N1 | 0 | G2, N1 | G1, N2 | 0 | 0 |
| phthalimide-N—O—CH₂COOC₂H₅ (M.P. 95-97°) | N4 | N4 | G3, N3 | G3, N2 | G2, N2 | N1 | N1 | N4 | N4 | — |
| CH₃—C(O)—N(H)—O—CH₂CH₂COOH (M.P. 88-90° C.) | N4 | N4 | N4 | N3, G4 | N4 | N3 | N3 | N | N4 | C2, G2 |
| 4-Cl-C₆H₄—N(H)—C(O)—N(H)—O—CH₂COOH (M.P. 174-175.5° C.) | N4 | N1, G3 | N4 | N3, G4 | | N1 | N1 | N4 | N4 | N4 |

The tabulated data above are presented to illustrate the types of herbicides which may be used in the method of this invention. Many other compounds may, of course, be employed within the scope of the method. It will be understood by those skilled in the art that use at lower application rates is preferable if it is desired to take maximum advantage of selective herbicidal properties. At higher rates of application only the most pronounced selectivity is clearly evident.

In controlling plant growth by means of herbicides it is necessary to obtain penetration of the formulation through waxy protective layers to obtain contact with plant fluids, and once contact is obtained, water solubility is desirable so as to cause the systemic migration of the herbicide. Water solubility and ability to penetrate or dissolve waxy cuticle are characteristics which seldom appear in a single substance and, in most instances, are not possessed by the herbicides themselves. It is therefore necessary to employ organic solvents in combination with solubilizers, dispersants, emulsifiers or other surface active agents in herbicide formulations. Furthermore, when using highly active herbicides, it is difficult to obtain uniform distribution of a small quantity of material unless it is dispersed or dissolved in a larger quantity of diluent before application. Preferred diluents are water and inert solids. From a practical standpoint, water is the preferred diluent because it is cheap and spray application is more convenient than dusting. The preferred formulations for use in the present method are water-dispersible solutions of herbicides in organic solvents. In a few instances, the herbicides themselves are soluble in water, so they may be sold and transported as concentrated aqueous solutions.

The present state of knowledge does not permit the development of a well-reasoned theory to explain the effectiveness of the class of herbicides employed in the method of the present invention. It does appear likely, however, that the electronic configuration of the N—O bond is a critical factor. The suitable compositions, without exception, contain electronegative substituent groups on the organic structure attached to oxygen. Furthermore, changes in the nature or number of these electronegative substituent groups result in readily apparent changes in herbicidal selectivity, as may be observed in the data tabulated above. One may compare, for example, the herbicidal characteristics of compounds corresponding to the following structural formulas:

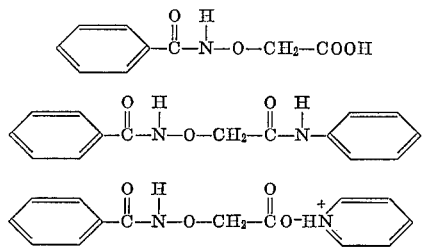

The apparent differences in herbicidal selectivity might conceivably be correlated with the reactivity of the nitrogen-to-oxygen bond, brought about by shifts in the valence electrons of the two organic groups attached thereto. At present, however, the data are not available to demonstrate such a correlation.

The herbicides which may be employed in the method of this invention are not articles of commerce, some of them belonging to novel classes of compounds, not previously made in the laboratory. So that the method of this invention may be more readily practiced, there are presented below representative procedures for preparation of various individual compounds. Suitable modifications of these procedures may be used to prepare the novel compounds disclosed as illustrative examples.

Preparation of 3-aminoöxypropionic acid hydrochloride

A mixture of methyl 3-isopropylideneaminoöxypropionate (15.0 g., 0.094 mol derived from acetone oxime and methyl acrylate) concentrated hydrochloric acid (75 ml.), and water (75 ml.) was stirred and heated to boiling. Approximately 25 ml. of distillate was collected, then the residual mixture was stripped under reduced pressure and the residue stirred 1 hour with isopropyl alcohol (100 ml.). Filtration and subsequent crystallization from an ethanol-ether mixture gave 7.3 g. (55%, M.P. 152–4° C.) of the desired compound.

Analysis.—Calculated for $C_3H_8ClNO_3$: C, 25.46; H, 5.68; N, 9.90. Found: C, 25.76; H, 5.49; N, 9.99.

Preparation of 3-acetamidoöxypropionic acid 3-aminoöxypropionic acid hydrochloride (14.1 g., 0.1 mol), acetic anhydride (15.3 g., 0.15 mol), and glacial acetic acid was stirred, heated, and refluxed 4 hours. The mixture was then cooled and stripped under reduced pressure on a steam bath. The residual material was then stirred 45 min. with dichloromethane (50 ml.). After filtration and drying there was obtained 5.6 g. (38%, M.P. 88–90° C.) of B-acetamidoöxypropionic acid.

Analysis.—Calculated for $C_5H_9NO_4$: C, 40.81; H, 6.16; N, 9.52. Found: C, 40.77; H, 6.08; N, 9.53.

Preparation of 2-benzamidoöxyacetanilide

To a solution of 2-bromoacetanilide (10.7 g., 0.05 mol) in 95% ethanol (200 ml.), was added a solution of potassium benzohydroxamate (8.8 g., 0.05 mol) in water (200 ml.). The mixture was heated, stirred, and refluxed five hours. The product mixture was then poured into excess water and the crude product was removed by filtration. One crystallization from ethanol gave 4.2 g. (31%, M.P. 137–8.5° C.) of 2-benzamidoöxyacetanilide.

Analysis.—Calculated for $C_{15}H_{14}N_2O_3$: C, 66.63; H, 5.23; N, 10.37. Found: C, 67.03; H, 5.17; N, 10.12.

Preparation of m-chlorobenzamidoöxyacetic acid

A mixture of m-chlorobenzohydroxamic acid (0.1 mol, 16.5 g.), bromoacetic acid (0.1 mol, 13.9 g.), sodium hydroxide (0.2 mol, 8.0 g.), ethanol (150 ml.) and water (150 ml.) was stirred, heated, and refluxed 5 hours. The mixture was then cooled and acidified with dilute hydrochloric acid. The mixture was then extracted with ethyl acetate (2×250 ml.) and the extracts were combined and dried over magnesium sulfate. Dilution of the dried extract with n-hexane precipitated the desired product which was removed by filtration and dried. There was obtained 17.1 g. (74%, M.P. 153–5° C.).

Analysis.—Calculated for $C_9H_8ClNO_4$: C, 47.07; H, 3.51; N, 6.10; Cl, 15.44. Found: C, 47.25; H, 3.86; N, 5.74; Cl, 15.44.

Preparation of ethyl phthalimidoöxyacetate

A mixture of N-hydroxyphthalimide (0.1 mol, 16.3 g.), ethyl bromoacetate (0.1 mol, 16.7 g.), and dimethylformamide (200 ml.) was stirred at room temperature while triethylamine (0.1 mol, 10.1 g.) was added over a period of 30 min. After addition of the triethylamine the mixture was stirred at ambient temperature for an additional 5 hours. The reaction mixture was diluted with water (600 ml.) and the crude product was removed by filtration, washed with sodium bicarbonate solution, water, hexane and then dried. There was obtained 18.2 g. of ethyl phthalimidoöxyacetate (M.P. 95–97° C., 73%).

Analysis.—Calculated for $C_{12}H_{11}NO_5$: C, 57.83; H, 4.45; N, 5.62. Found: C, 57.78; H, 4.44; N, 5.85.

Preparation of m-chlorophenylureidoöxyacetic acid

Aminoöxyacetic acid hemi-hydrochloride (4.36 g., 0.04 eq.), pyridine (75 ml.), and dimethylformamide (25 ml.) were mixed, stirred 15 minutes, then filtered. To the filtrate was added m-chlorophenylisocyanate (6.149, 0.04 mole). The mixture was stirred 1 hour at ambient temperature, then concentrated under reduced pressure. The concentrate was acidified with dilute hydrochloric acid and filtered to remove the crude product. This crude material was stirred with excess sodium hydroxide solution (10%), filtered, and the filtrate acidified with dilute hydrochloric acid. The precipitated product was collected by filtration, washed with water, and dried giving 6.0 g. (61.4%; M.P. 174–5.5° C.) of the desired compounds.

*Analysis.*—Calculated for $C_9H_9ClNO_{24}$: C, 44.18; H, 3.71; N, 11.45; Cl, 14.49. Found: C, 44.38; H, 3.65; N, 11.28; Cl, 14.47.

Various substituted aminoöxyacetic acids and esters may be prepared by modification of procedures disclosed in the literature, references to which appear above.

Many modifications and variations in choice of herbicidal compounds and ingredients in formulations may be made within the scope of the invention, as practiced by those who are skilled in the art.

What is claimed is:

1. The method of combating undesired plant growth which comprises applying to the locus of the plant a herbicidal quantity of a compound selected from the group consisting of compounds represented by the formula

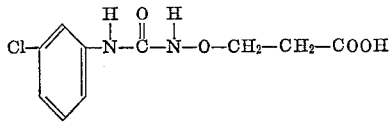

and lower alkyl esters and alkali metal, ammonium and amine salts thereof.

2. The method of controlling plant growth which comprises applying to the locus of the plant a herbicidal quantity of a compound corresponding to the formula

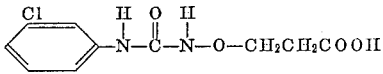

3. A composition for combating undesired plant growth comprising a diluent and a herbicidally effective amount of a compound represented by the formula

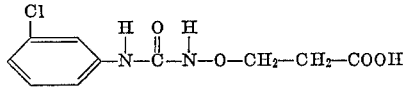

References Cited

UNITED STATES PATENTS

| | | | |
|---|---|---|---|
| 3,282,987 | 11/1966 | Ellis | 260—471 |
| 3,162,525 | 12/1964 | Leasure | 71—2.7 |
| 3,236,871 | 2/1966 | Hinman et al. | 260—453 |

LEWIS GOTTS, Primary Examiner

M. KASSENOFF, Assistant Examiner

U.S. Cl. X.R.

71—79, 94, 96, 105, 106, 107, 111, 113, 118; 260—295, 326, 453, 465.5, 471, 482, 501.11, 518, 519, 534, 561

PO-1050
(5/69)

UNITED STATES PATENT OFFICE
CERTIFICATE OF CORRECTION

Patent No. __3,457,063__     Dated __July 22, 1969__

Inventor(s)     Ralph P. Neighbors

It is certified that error appears in the above-identified patent and that said Letters Patent are hereby corrected as shown below:

Columns 3 and 4, the last entry in the table under Oats should read --N3--. Columns 5 and 6, the second structural formula in the table, that portion reading

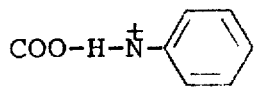   should read   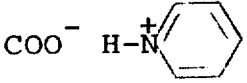

Columns 7 and 8, the next to the last entry in the table under Radish should read --N4--. Columns 7 and 8, the last entry in the table under Corn should read --0--.

SIGNED AND
SEALED
MAR 24 1970

(SEAL)
Attest:

Edward M. Fletcher, Jr.
Attesting Officer

WILLIAM E. SCHUYLER, JR.
Commissioner of Patents